US009373377B2

(12) United States Patent
Hendrickson

(10) Patent No.: US 9,373,377 B2
(45) Date of Patent: Jun. 21, 2016

(54) APPARATUSES, INTEGRATED CIRCUITS, AND METHODS FOR TESTMODE SECURITY SYSTEMS

(75) Inventor: Nicholas T. Hendrickson, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 13/420,430

(22) Filed: Mar. 14, 2012

(65) Prior Publication Data

US 2013/0125245 A1 May 16, 2013

Related U.S. Application Data

(60) Provisional application No. 61/559,813, filed on Nov. 15, 2011.

(51) Int. Cl.
| | |
|---|---|
| *H03K 19/00* | (2006.01) |
| *G11C 7/24* | (2006.01) |
| *G01R 31/317* | (2006.01) |
| *G11C 29/46* | (2006.01) |
| *G06F 21/31* | (2013.01) |
| *G06F 21/10* | (2013.01) |

(52) U.S. Cl.
CPC ............ *G11C 7/24* (2013.01); *G01R 31/31719* (2013.01); *G11C 29/46* (2013.01); *G06F 21/10* (2013.01); *G06F 21/31* (2013.01); *H03K 19/00* (2013.01)

(58) Field of Classification Search
CPC ......... G06F 21/10; G06F 21/31; G01R 31/31; G01R 31/28; H03K 19/00
USPC .............................. 726/28; 365/201; 714/726
See application file for complete search history.

(56) References Cited

U.S. PATENT DOCUMENTS

| | | | |
|---|---|---|---|
| 5,604,710 A * | 2/1997 | Tomishima et al. ..... 365/230.03 |
| 5,941,987 A * | 8/1999 | Davis ............................... 726/26 |
| 6,216,248 B1 | 4/2001 | McConnell et al. |
| 6,385,727 B1 | 5/2002 | Cassagnol et al. |
| 6,968,459 B1 | 11/2005 | Morgan et al. |
| 7,076,667 B1 * | 7/2006 | Gama et al. .................... 713/193 |
| 7,725,788 B2 | 5/2010 | Tkacik et al. |
| 7,802,157 B2 * | 9/2010 | Pekny ........................... 714/724 |
| 2004/0103346 A1 * | 5/2004 | Dietz et al. ...................... 714/25 |
| 2007/0226562 A1 * | 9/2007 | Tkacik et al. .................. 714/726 |
| 2008/0091930 A1 * | 4/2008 | Conti et al. ........................ 713/1 |
| 2008/0238468 A1 * | 10/2008 | Sturm et al. ................... 324/763 |
| 2009/0150623 A1 * | 6/2009 | Yoshioka ....................... 711/154 |
| 2010/0070696 A1 * | 3/2010 | Blankenship ................. 711/105 |

* cited by examiner

*Primary Examiner* — Jeffrey Pwu
*Assistant Examiner* — Samuel Ambaye
(74) *Attorney, Agent, or Firm* — Dorsey & Whitney LLP

(57) ABSTRACT

Apparatuses, integrated circuits, and methods are disclosed for testmode security systems. In one such example apparatus, a data storage is configured to store data. A testmode security system is configured to allow a user to access one or more testmodes of the apparatus at least partially responsive to the data storage not storing sensitive data and disallow the user from accessing the one or more testmodes of the apparatus at least partially responsive to the data storage storing sensitive data.

26 Claims, 6 Drawing Sheets

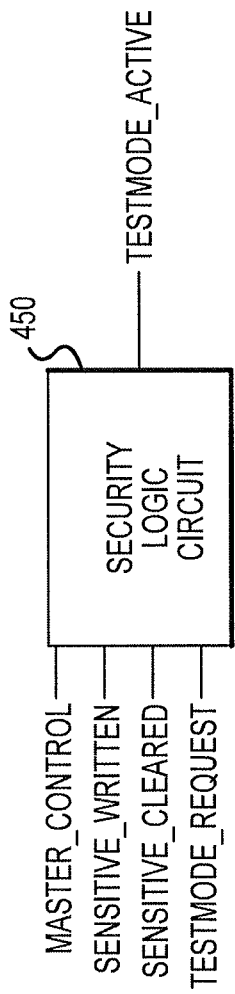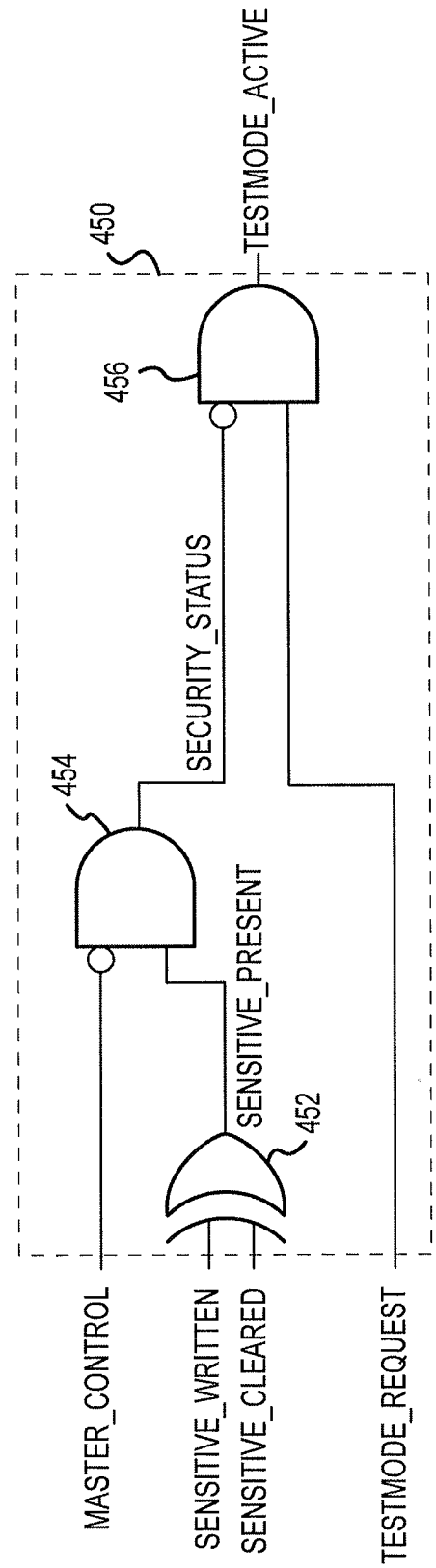

APPARATUSES, INTEGRATED CIRCUITS, AND METHODS FOR TESTMODE SECURITY SYSTEMS

CROSS REFERENCES TO RELATED APPLICATIONS

This application claims benefit under 35 U.S.C. §119(e) to U.S. provisional application No. 61/559,813, entitled "A Security Protocol for Disabling Manufacturing Modes in Memory Devices" filed on Nov. 15, 2011, which is incorporated herein by reference in its entirety.

TECHNICAL FIELD

Embodiments of the invention relate generally to integrated circuits, and more particularly, in one or more of the illustrated embodiments, to testmode security systems.

BACKGROUND OF THE INVENTION

Integrated circuits manufactured today frequently include several different operational modes, such as a normal mode, a low power mode, and so forth. Some integrated circuits also include one or more testmodes, which may be used to verify that the integrated circuit was manufactured correctly, to debug any problems with the integrated circuit, and so forth. Usually, a testmode allows relatively broad and flexible access to the integrated circuit in order to be able to thoroughly test as much of the integrated circuit as possible. If the testmode does not have access to a particular feature or portion of the integrated circuit, an engineer may not be able to verify that feature or portion of the integrated circuit after manufacturing and/or be able to debug that feature or portion of the integrated circuit if problems are subsequently encountered.

Integrated circuits manufactured today also frequently include one or more storage elements, some of which may store sensitive data. As hackers and viruses continuously exploit loopholes in software, electronic device designers frequently turn to hardware such as integrated circuits to find ways to increase security. For example, an encryption key may be stored in a memory circuit in order to encrypt the contents of the memory and/or encrypt data being read from or written to the memory and thus prevent unauthorized access. The sensitive data may not be accessible during a normal mode. For example, sensitive data (such as the encryption key mentioned above) may be used internally in an integrated circuit, but it may be desirable to prevent a user from externally being able to access the sensitive data (thereby enabling theft or manipulation of the sensitive data). If the sensitive data is important enough, it may even be desirable to prevent a user from being able to access the sensitive data during a testmode. As mentioned above, however, testmodes generally provide relatively broad and flexible access to an integrated circuit. Therefore, even if access to the sensitive data is not directly available in a testmode, the broad and flexible access a testmode provides may allow a determined user to compromise the security protocols of the testmode and obtain unauthorized access to the sensitive data. Thus in some cases it may be desirable to lockout all testmodes in order to ensure no access to the sensitive data. However, if access to one or more testmodes is disallowed because of the presence of sensitive data, an engineer may not be able to test the circuit.

One approach to resolving the tension between allowing broad access to testmodes in an integrated circuit on the one hand, and securing sensitive data in the integrated circuit from being improperly accessed on the other hand, is to only enable access to the testmodes if a secret code is provided to the integrated circuit. This type of approach may be effective in some situations, but it may be difficult to prevent the secret code from being improperly distributed to malicious users.

BRIEF DESCRIPTION OF THE DRAWINGS

FIG. 4A is a block diagram of a security logic circuit for use in the apparatus of FIG. 1 according to an embodiment of the invention.

FIG. 4B is a schematic diagram of an embodiment of the security logic circuit of FIG. 4A.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
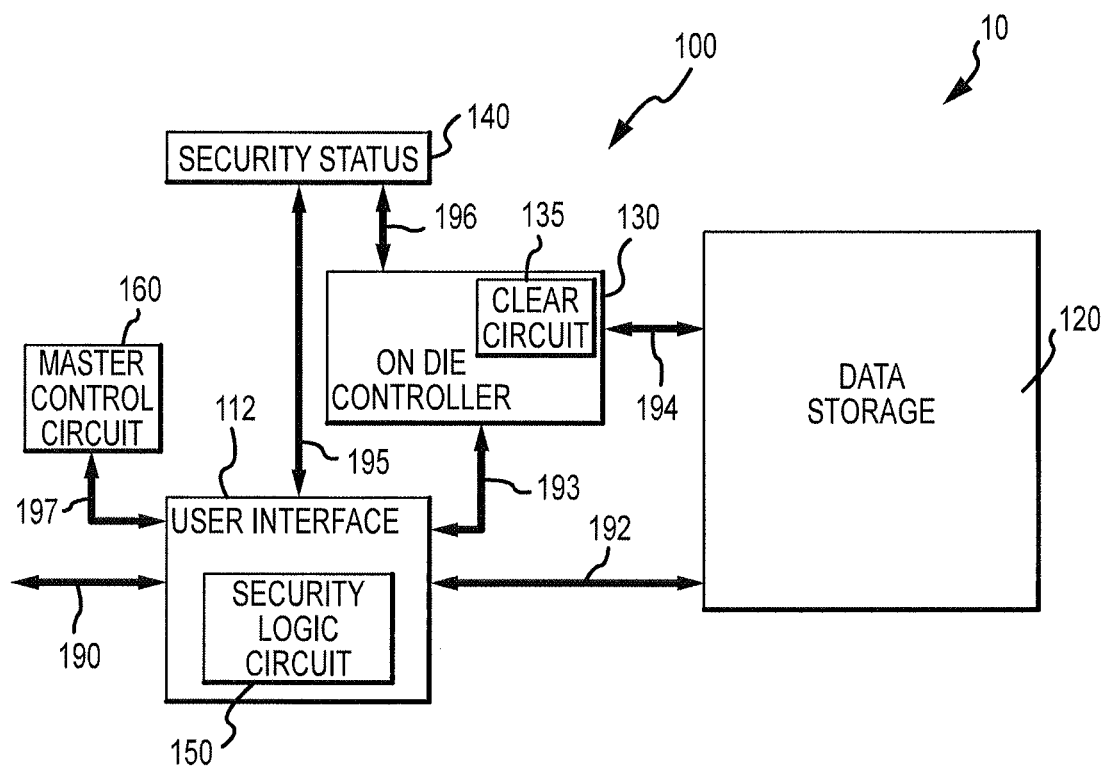
FIG. 1 is a block diagram of an apparatus according to an embodiment of the present invention.

FIG. 1 illustrates an apparatus 10 that includes a testmode security system 100. The testmode security system 100 is coupled to a data storage 120. As explained in more detail below, the data storage 120 may in some embodiments be configured to store sensitive data. The testmode security system 100 includes an on-die controller 130, a security status register 140, and a security logic circuit 150. The testmode security system 100 may also include a clear circuit 135 and/or a master control circuit 160 in some embodiments. In some embodiments, the security logic circuit 150 may be included as part of a user interface 112.

As will be described in more detail below, the security logic circuit 150, the security status register 140, and the on-die controller 130 may, along with the clear circuit 135 and/or the master control circuit 160, if present, form the testmode security system 100 that allows a user to access one or more testmodes when the data storage 120 does not store sensitive data, and when the data storage 120 stores sensitive data and access to a testmode is requested, controls access to one or more testmodes of the apparatus 10 (e.g., disallows access) and/or clears the stored sensitive data before allowing access to one or more testmodes.

The apparatus 10 includes an input/output (I/O) bus 190 that provides an interface between an external circuit and the testmode security system 100 through the user interface 112. The testmode security system 100 may receive and/or provide commands and/or data to the external circuit over the I/O bus 190. For example, the testmode security system 100 may receive a testmode request command from the external circuit over the I/O bus 190. The apparatus 10 also includes a bus 192 that couples the user interface 112 and the data storage 120, a bus 193 that couples the user interface 112 and the on-die controller 130, a bus 194 that couples the on-die controller 130 and the data storage 120, a bus 195 that couples the security status register 140 and the user interface 112, a bus 196 that couples the security status register 140 and the on-die controller 130, and a bus 197 that couples the user interface 112 and the master control circuit 160.

The on-die controller 130 may be a state machine, a microcontroller, a processor, and so forth, and may control access to the data storage 120 (including any sensitive data stored there, if any) and/or other portions of the apparatus 10. The on-die controller 130 may provide different levels of access to the data storage 120 (and/or other portions of the apparatus 10) depending on the requirements of the apparatus 10. For example, during a "normal" operational mode, the on-die controller 130 may provide read and write access to the data storage 120. During a testmode, if allowed (as explained in more detail below), the on-die controller 130 (and/or other circuitry such as the user interface 112 within the apparatus 10) may allow testmode access to the apparatus 10. In general, the on-die controller 130 may be configured to provide many different levels of access to the data storage 120 in different operational modes, or even within a single operational mode. The on-die controller 130 may also be coupled to the security status register 140 as illustrated in FIG. 1. In other embodiments, however, a circuit within the testmode security system 100 other than the on-die controller 130 may provide access to the data storage 120 and/or the security status register 140. For example, as illustrated in FIG. 1, the user interface 112 may provide access to the data storage 120 and or the security status register 140. In general, the user interface 112 and the on-die controller 130 may have different levels of access to the data storage 120 and/or to other portions of the apparatus 10.

The security status register 140 stores one or more bits of security status information, which indicate(s), for example, whether sensitive data is stored in the data storage 120. The security status register 140 may be a single bit (e.g., a flag) that indicates whether sensitive data is stored in the data storage 120 in some embodiments. In other embodiments, the security status register 140 may include a plurality of security status bits; for example, one bit to indicate whether sensitive data has been written to the data storage 120, and a second bit to indicate whether the sensitive data has been cleared from the data storage 120.

In some embodiments, the security status register 140 may be separate from other registers, whereas in other embodiments, the security status register 140 may be part of another register, such as a system status register, with the security status register 140 including only one or more bits of the system status register. In still other embodiments, a storage element other than a register may store security status information indicating, for example, whether sensitive data is stored in the data storage 120.

The security status register 140 may be non-volatile storage in some embodiments (e.g., NOR flash memory, NAND flash memory, phase change memory, and so forth), or may be volatile storage in other embodiments (e.g., DRAM). In embodiments where the security status register 140 includes one or more volatile storage elements, the testmode security system 100 may change the information stored in the security status register 140 upon system startup by scanning the data storage 120 to detect whether any sensitive data is stored in the data storage 120.

The security status register 140 is coupled to the security logic circuit 150 in order to provide the security logic circuit 150 with signals corresponding to the security status information stored in the security status register 140. The security status register 140 may also be coupled to the on-die controller 130 and/or other circuitry in the testmode security system 100 in order to allow the on-die controller 130 and/or other circuitry to change the information stored in the security status register 140.

In some embodiments, the testmode security system 100 may include a clear circuit 135, which may clear some or all of the sensitive data stored in the data storage 120 in response to a clear or other command. Although reference is made herein to "clearing" bits of data, it will be understood that "clearing" the bits of data may include either erasing or programming the bits of data to logic high or logic low levels. Alternatively, the data bits may be randomized. In general, "clearing" may include any method by which previously stored data is rendered unreadable.

The clear circuit 135 may clear the data in the sensitive data from the data storage 120 in response to receiving a clear command via I/O bus 190. In other embodiments, however, the clear circuit 135 may clear the sensitive data from the data storage 120 in response to receiving a testmode request. In other words, in these embodiments, when the testmode security system 100 receives a testmode request, a clear command may be implied in the testmode request (in which case the sensitive data is cleared, subsequent to which access to a testmode may be allowed). As mentioned, the clear circuit 135 may clear the sensitive data stored in the data storage 120 in response to a clear or other command, but the clear circuit 135 may also or alternatively clear the entirety of the data storage 120, in some embodiments, in response to a clear or other command to clear the entire data storage 120. In some embodiments, the clear circuit 135 may be a part of the on-die controller 130, whereas in other embodiments, the clear circuit 135 may not be a part of the on-die controller 130.

A master control circuit 160 may also be provided in the testmode security system 100 in some embodiments. The master control circuit 160 may provide a mechanism whereby the security status information in the security status register 140 is disregarded in order to allow access to one or more special testmodes. For example, if access to one or more testmodes are needed before the security status information in the bit or bits of the security status register 140 can be established and/or resolved, or even before the security logic circuit 150 is initialized in some embodiments, the master control circuit 160 may provide a mechanism to enable access to the one or more testmodes regardless of the security status information stored in the security status register 140. In other embodiments, such as those where no access to testmodes is needed before the security status information stored in the security status register 140 can be established and/or resolved, or before the security logic circuit 150 is initialized, however, no master control circuit may be needed.

The security logic circuit 150 may be coupled to the security status register 140 and/or to the on-die controller 130, and may be configured to selectively allow access to one or more testmodes at least partially in response to receiving one or more signals corresponding to the security status information stored in the security status register 140. A master control signal from the master control circuit 160 may also be provided to the security logic circuit 150 in some embodiments and the security logic circuit 150 may selectively allow access to one or more testmodes at least partially in response to the master control signal.

For example, in embodiments where the security status register 140 includes only a single security status bit indicating whether sensitive data is stored in the data storage 120 and where no master control circuit is present, a signal corresponding to the single security status bit of the security status register 140 may be provided to the security logic circuit 150 as a security status signal. The security status signal may indicate whether sensitive data is stored in the data storage 120. In other embodiments, such as those where the security status register 140 includes multiple security status bits and/or embodiments that include a master control circuit 160, signals corresponding to the one or more security status bits from the security status register 140 and/or a master control signal from the master control circuit 160 may be provided to the security logic circuit 150, and the security logic circuit 150 itself may provide the security status signal in response to the one or more security status bits and/or the master control signal. In still other embodiments where the security status register 140 includes multiple security status bits and/or embodiments that include a master control circuit 160, signals corresponding to the one or more security status bits from the security status register 140 and/or a master control signal from the master control circuit 160 may be provided to a different circuit (not illustrated), and the different circuit may generate the security status signal and provide the generated security status signal to the security logic circuit 150.

A testmode request signal may also be provided to the security logic circuit 150 in some embodiments. The testmode request signal may be provided to the security logic circuit 150 in response to a testmode command, a secret code, or any type of command being provided to the testmode security system 100. For example, as mentioned above, the testmode security system 100 may receive a testmode request command via I/O bus 190 in some embodiments, but in other embodiments, testmode requests may be provided to a dedicated testmode request pad on the apparatus 10. In general, a testmode request can be communicated to the security logic circuit 150 in many different ways.

The data storage 120 may include one or more different types of storage elements. For example, the data storage 120 may include a memory array, status registers, firmware code, and so forth. The data storage 120 may include volatile and/or non-volatile storage elements, for example DRAM or SRAM memory for volatile storage elements, and NOR or NAND flash memory for non-volatile storage elements. As mentioned above, the data storage 120 may be used to store sensitive data in the one or more different types of storage elements. The sensitive data may include security keys, encryption keys, and so forth. In general, many types of data may be considered "sensitive." In some embodiments, any data stored within a predefined area within the data storage 120 may be designated as sensitive data, such as a certain register that can hold an encryption key. In these embodiments, anytime data is stored in that predefined location, that data may be considered to be "sensitive" data. In other embodiments, however, whether data stored within a certain area of the data storage 120 is sensitive may be user-specified. For example, if the data storage 120 is a memory array, as data is being written to the memory array 120, the testmode security system 100 may flag certain data written to the memory as being "sensitive." In these embodiments, a table may be maintained that indicates which locations (if any) within the data storage 120 include sensitive data. Alternatively, each storage location within the data storage 120 may indicate whether that location currently stores sensitive data.

In operation, before sensitive data is stored in the data storage 120, the testmode security system 100 generally allows access to one or more testmodes. If a testmode request is provided to the testmode security system 100, the testmode security system 100 generally provides access to the requested testmode by, for example, providing a testmode active signal that configures the apparatus 10 to allow the access to one or more testmodes.

Before or at the same time as the sensitive data is stored in the data storage 120, however, the security status information in the security status register 140 is updated (by, for example, the on-die controller 130) to indicate that sensitive data is stored in the data storage 12. Once the security status information is updated, the testmode security system 100 disallows access to the one or more testmodes by disallowing (e.g., blocking, ignoring) any testmode requests provided to the testmode security system 100.

If access to one or more testmodes is needed after sensitive data has been stored in the data storage 120 (e.g., in order to debug the apparatus 10), the sensitive data stored in the data storage 120 may be cleared by the clear circuit 135 in response to a clear or other command. After the clear circuit 135 clears the sensitive data from the data storage 120, the security status information is updated again (by, for example, the on-die controller 130) to indicate that sensitive data is no longer stored in the data storage 120. Once the security status information is updated, the testmode security system 100 once again allows access to the one or more testmodes.

The testmode security system 100 may allow or disallow access to one or more testmodes by, for example, receiving or generating the security status signal indicating whether sensitive data is stored in the data storage 120. As described above, the security status signal may be provided or received by the security logic circuit 150 in response to the security status information stored in the security status register 140 and/or the master control signal from the master control circuit 160.

In some embodiments, the testmode security system 100 only controls access to the one or more specific testmodes. In other embodiments, however, the testmode security system 100 may alternatively be used to selectively allow and disallow all testmode requests based on whether any sensitive data is stored in any location at all within the apparatus 10. In these embodiments, before access to one or more testmodes is allowed, the sensitive data in the data storage 120 may need to be cleared. By disallowing all testmode access requests when sensitive data is stored in the data storage 120, the security system 100 may prevent a malicious user from finding and exploiting loopholes in a security system 100 that would otherwise allow access to one or more testmodes.

Figure 2A:
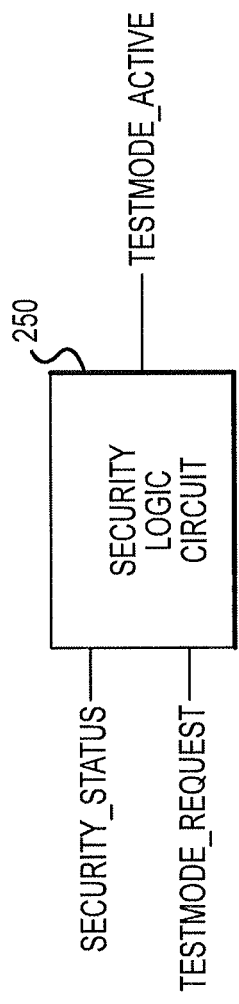
FIG. 2A is a block diagram of a security logic circuit for use in the apparatus of FIG. 1 according to an embodiment of the invention.

FIG. 2A illustrates a security logic circuit 350 which may be used in the apparatus 10 of FIG. 1. The security logic circuit 250 is provided a SECURITY_STATUS signal and a TESTMODE_REQUEST signal, and in response provides a TESTMODE_ACTIVE signal. The SECURITY_STATUS signal may correspond to a single security status bit in the security status register 140 that indicates whether sensitive data is stored in the data storage 120. Only a single security status bit may be needed where the security status register 140 is a storage element that is bit alterable in two directions (e.g., erasing to a logic high and programming to a logic low, and vice versa). As explained in more detail below, if the security status register 140 is a storage element that is bit alterable in one direction (e.g., programming to a logic low), but only block alterable in the other direction (e.g., erasing to a logic high), a plurality of security status bits may be used. Nonetheless, even if the security status register 140 is a storage element that is bit alterable in only one direction, a single security status bit may still be used, including, for example, where erase and program functionality are readily available for the single security status bit in the security status register 140. The TESTMODE_REQUEST signal may correspond with a request received by the apparatus 10 to access a testmode.

The TESTMODE_ACTIVE signal may be provided in order to configure the apparatus 10 to allow or disallow access to one or more requested testmodes. The TESTMODE_ACTIVE signal may configure the apparatus to allow access to one or more testmodes by causing additional and/or different functionality, supplemental commands, and so forth to be available to a user. The TESTMODE_ACTIVE signal may also or alternatively configure the apparatus to allow one or more testmodes to access portions of the apparatus not accessible during normal operations, such as access to sensitive data stored within the data storage 120. In some apparatuses 10, only a single testmode may be available, but in other apparatuses 10, a plurality of testmodes may be available. In general, the TESTMODE_ACTIVE signal may allow or disallow access to one or more of the available testmodes in an apparatus 10. Additionally or alternatively, in some embodiments, the TESTMODE_ACTIVE signal may trigger clearing of any sensitive data stored in the data storage 120 of the apparatus by the clear circuit 135, subsequent to which access to the one or more testmodes may be allowed.

Figure 2B:
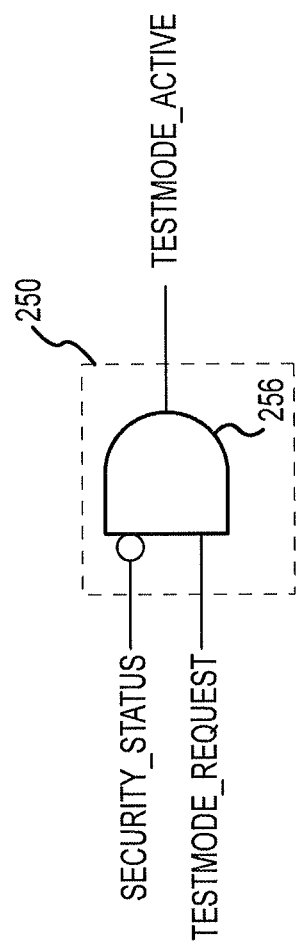
FIG. 2B is a schematic diagram of an embodiment of the security logic circuit of FIG. 2A.

FIG. 2B illustrates an embodiment of a security logic circuit 250, which may be used for the security logic circuit 250 in FIG. 2A. The security logic circuit 250 illustrated in FIG. 2B includes an AND gate 256 with one inverted input. The SECURITY_STATUS signal is provided to the inverted input of the AND gate 256, and the TESTMODE_REQUEST signal is provided to the uninverted input of the AND gate 256. The output of the AND gate 256 is provided as the TESTMODE_ACTIVE signal.

In operation, the AND gate 256 of the security logic circuit 250 in FIG. 2B gates the TESTMODE_REQUEST signal with the SECURITY_STATUS signal to indicate whether access to one or more testmodes should be allowed or disallowed. As long as the TESTMODE_REQUEST signal is logic low (which may indicate that no testmode is being or has been requested), the TESTMODE_ACTIVE signal will remain logic low, thus disallowing access to one or more testmodes. When the TESTMODE_REQUEST signal transitions to logic high (which may indicate that access to one or more testmodes is being or has been requested), the TESTMODE_ACTIVE signal will only transition to logic high and thereby allow access to the one or more testmodes if the SECURITY_STATUS signal is logic low (which may indicate that no sensitive data is stored in the data storage 120). If the SECURITY_STATUS signal is logic high (which may indicate that sensitive data is stored in the data storage 120), the TESTMODE_ACTIVE signal will remain logic low and thus disallow access to the one or more testmodes.

Figure 3A:
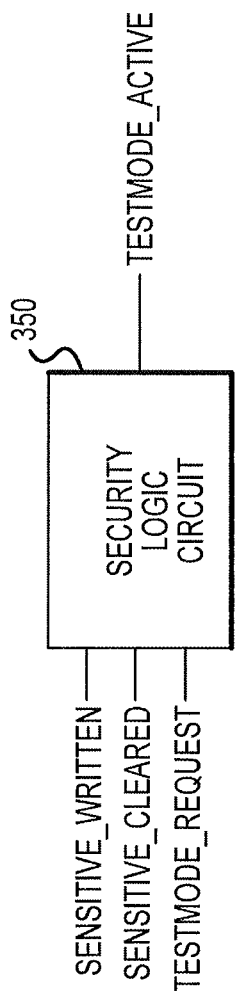
FIG. 3A is a block diagram of a security logic circuit for use in the apparatus of FIG. 1 according to an embodiment of the invention.

FIG. 3A illustrates a security logic circuit 350 which may be used in the apparatus 10 of FIG. 1. The security logic circuit 350 is provided a SENSITIVE_WRITTEN signal, a SENSITIVE_CLEARED signal, and a TESTMODE_REQUEST signal, and in response provides a TESTMODE_ACTIVE signal. The SENSITIVE_WRITTEN signal may correspond to a security status bit in the security status register 140 that indicates whether sensitive data has been written in the data storage 120, and the SENSITIVE_CLEARED signal may correspond to a security status bit in the security status register 140 that indicates whether sensitive data has been cleared from the data storage 120. As explained above, two security status bits (e.g., a sensitive written security status bit and a sensitive cleared status bit) may be used where the security status register 140 is a storage element that is bit alterable in only one direction. The TESTMODE_REQUEST signal may correspond with a request received by the apparatus 10 to access a testmode. The TESTMODE_ACTIVE signal may be provided in order to configure the apparatus 10 to allow or disallow access to the requested testmode.

Figure 3B:
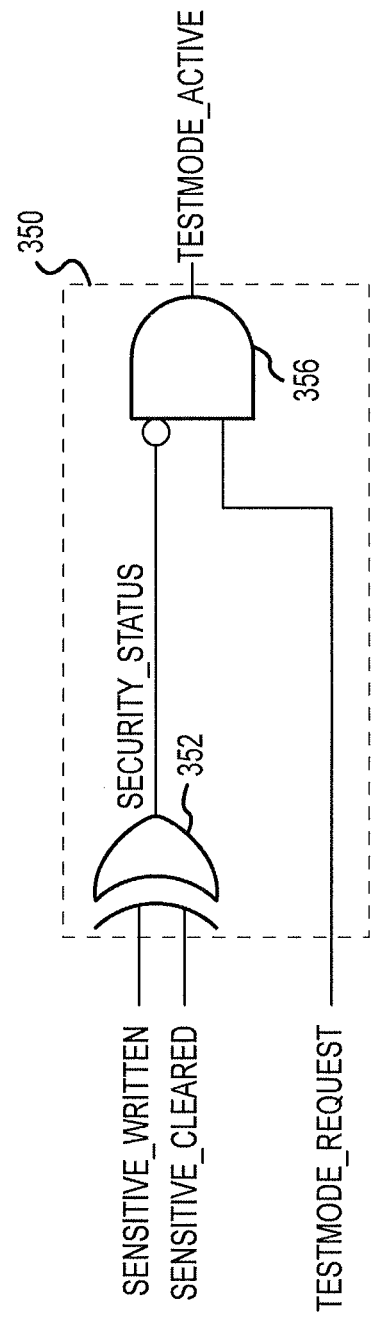
FIG. 3B is a schematic diagram of an embodiment of the security logic circuit of FIG. 3A.

FIG. 3B illustrates an embodiment of a security logic circuit 350, which may be used for the security logic circuit 350 in FIG. 3A. The security logic circuit 350 illustrated in FIG. 3B includes an XOR gate 352 and an AND 356 gate with one inverted input. The SENSITIVE_WRITTEN and SENSITIVE_CLEARED signals are provided to the inputs of the XOR gate 352, and the output of the XOR gate 352 is provided as a SECURITY_STATUS signal. The SECURITY_STATUS signal is provided to the inverted input of the AND gate 356, and the TESTMODE_REQUEST signal is provided to the uninverted input of the AND gate 356. The output of the AND gate 356 is provided as the TESTMODE_ACTIVE signal.

In operation, the XOR gate 352 provides a logic low SECURITY_STATUS signal if neither or both of the SENSITIVE_WRITTEN and the SENSITIVE_CLEARED signals are logic high, and provides a logic high SECURITY_STATUS signal if only one of the SENSITIVE_WRITTEN and the SENSITIVE_CLEARED signals is logic high. In this manner, the SECURITY_STATUS signal is logic low if sensitive data has not been written to the data storage 120 or if sensitive data has been written to the data storage 120 but has also been cleared from the data storage 120. On the other hand, if sensitive data has been written to the data storage 120 but has not been cleared from the data storage 120, the SECURITY_STATUS signal is logic high. Similar to the AND gate 256 of the security logic circuit 250 illustrated in FIG. 2B, the AND gate 356 of the security logic circuit 350 illustrated in FIG. 3B gates the TESTMODE_REQUEST signal with the SECURITY_STATUS signal to indicate whether access to one or more testmodes should be allowed or disallowed, as explained above.

FIG. 4A illustrates a security logic circuit 450 which may be used in the apparatuses 10 of FIG. 1. The security logic circuit 450 is provided a MASTER_CONTROL signal, a SENSITIVE_WRITTEN signal, a SENSITIVE_CLEARED signal, and a TESTMODE_REQUEST signal, and in response provides a TESTMODE_ACTIVE signal. The MASTER_CONTROL signal may be provided by a master control circuit (as explained above and below) to allow access to a special testmode, such as a pre-power-up testmode. The SENSITIVE_WRITTEN signal, the SENSITIVE_CLEARED signal, the TESTMODE_REQUEST signal, and the TESTMODE_ACTIVE signal may be similar to the identically named signals in FIG. 3A.

FIG. 4B illustrates an embodiment of a security logic circuit 450, which may be used for the security logic circuit 450 in FIG. 4A. The security logic circuit 450 illustrated in FIG. 4B includes an XOR gate 452, an first AND gate 454 with one inverted input, and a second AND 456 gate with one inverted input. As in FIG. 3B, the SENSITIVE_WRITTEN and SENSITIVE_CLEARED signals are provided to the inputs of the XOR gate 452. The output of the XOR gate 452 is provided as a SENSITIVE PRESENT signal, which is in turn provided to the uninverted input of the first AND gate 454. The MASTER_CONTROL signal is provided to the inverted input of the first AND gate 454. The output of the first AND gate 454 is provided as a SECURITY_STATUS signal. The SECURITY_STATUS signal is in turn provided to the inverted input of the second AND gate 456, and the TESTMODE_REQUEST signal is provided to the uninverted input of the second AND gate 456. The output of the second AND gate 456 is provided as the TESTMODE_ACTIVE signal.

In operation, the first AND gate 454 may allow the TESTMODE_ACTIVE signal to be provided as a logic high regardless of the logic level of the SENSITIVE_WRITTEN and the SENSITIVE_CLEARED signals, in order to provide access to a special testmode. For example, if the MASTER_CONTROL signal is logic high, the SECURITY_STATUS signal will be logic low no matter what the logic levels of the SENSITIVE_WRITTEN and the SENSITIVE_CLEARED signals are, thereby forcing the security logic circuit 450 to allow access to the testmode regardless of the security status information stored in the security status register 140.

The XOR gate 452 and the second AND gate 456 in the embodiment of the security logic circuit 450 illustrated in FIG. 4B are operationally similar to the XOR gate 352 and the AND gate 356 illustrated in FIG. 3B and described above.

Figure 5:
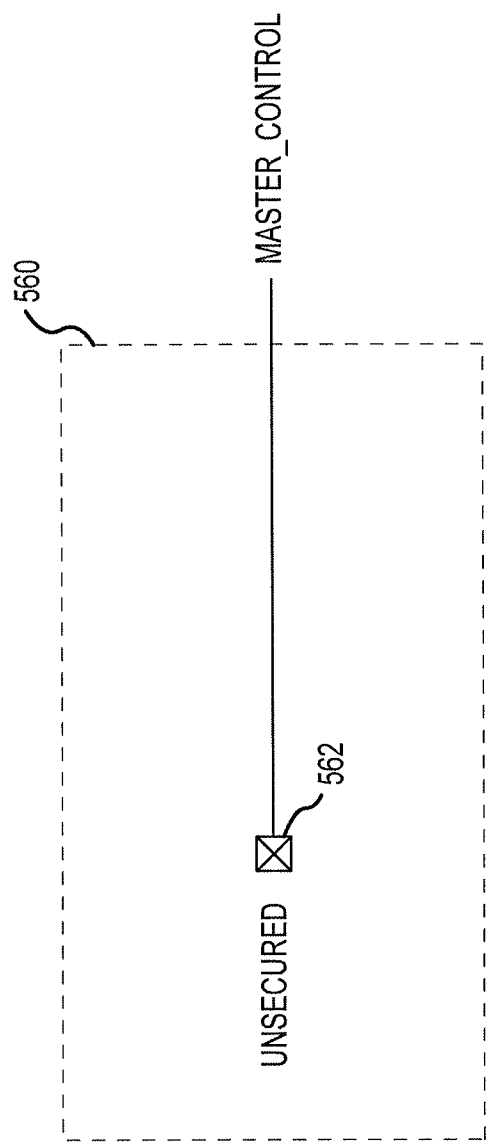
FIG. 5 is a schematic diagram of a master control circuit for use in the apparatus of FIG. 1 according to an embodiment of the invention.

FIG. 5 illustrates one embodiment of a master control circuit 560 that may be used for the master control circuit 160 of FIG. 1. As mentioned above, a master control circuit is not required in the apparatus 10 of FIG. 1, but may be included if, for example, access to a special testmode is needed. As one example, if access to a pre-power-up testmode is needed to test an apparatus 10 before power is provided to the apparatus 10, the security status information stored in the bit or bits in the security status register 140 may not be available for use by the security logic circuit 150. Before power-up, the bit or bits may be unknown logic levels, or even undefined logic levels. In this case, a master control circuit, such as the master control circuit 560 illustrated in FIG. 5 may be included in the apparatus 10 in order to provide access to the pre-power-up testmode regardless of the logic levels of the security status bit or bits.

As illustrated in the embodiment in FIG. 5, the master control circuit 560 may include a bondpad 562. After manufacturing, but before packaging the apparatus 10, the bondpad 562 may be provided a logic high UNSECURED signal from, for example, a testmode machine or engineer. If the apparatus 10 is an integrated circuit, the integrated circuit may still be in a wafer form. When a logic high UNSECURED signal is provided to the bondpad 562, the MASTER_CONTROL signal may be logic high, which may indicate that access to a special testmode should be allowed. As described above, if a logic high MASTER_CONTROL signal is provided to the security logic circuit 450 in FIGS. 4A and 4B, the SECURITY_STATUS signal will be logic low regardless of the logic levels of the SENSITIVE_WRITTEN and SENSITIVE_CLEARED signals (e.g., regardless of the respective security status information stored in the security status register 140), which may allow the TESTMODE_ACCESS signal to transition with the TESTMODE_REQUEST signal, thereby allowing access to the testmode regardless of the logic levels of the SENSITIVE_WRITTEN and SENSITIVE_CLEARED signals.

However, after the apparatus 10 is verified and packaged, a bondwire (not illustrated in FIG. 5) may couple the bondpad 562 to a reference voltage node, such as ground. Once the bondpad 562 is coupled to the reference voltage node such as ground, the MASTER_CONTROL signal may be forced to a logic low in order to disallow access to the previously available special testmode subsequent to packaging the apparatus 10. The bondwire may thus indicate to the apparatus 10 that no access to the special testmode should be allowed, and that instead, access to one or more testmodes should only be allowed as a function of the security status information stored in the security status register 140. Because the bondwire couples the bondpad 562 directly to the reference voltage node such as ground, the MASTER_CONTROL signal cannot be changed to logic high by, for example, the on-die controller 130.

In some embodiments, the bondpad 562 may be weakly coupled (not illustrated in FIG. 5) to a voltage source such as VCC in order to provide a logic high MASTER_CONTROL signal when the bondpad 562 floats.

Also, different embodiments of master control circuits may be used other than the embodiment illustrated in FIG. 5. For example, a fuse or anti-fuse, a non-volatile storage element, or many other types of circuits may be used as a master control circuit. A fuse or anti-fuse may be used if the fuse or anti-fuse will be operable during the testmode request (e.g., before power-up). As just one example, a fuse may couple a node to a voltage source such as VCC and an anti-fuse may couple the same node to a reference voltage such as ground. Before packaging, the fuse coupling the node to the voltage source such as VCC would force the MASTER_CONTROL signal to be logic high, but just before or during packaging, the fuse and anti-fuse may be blown, after which the anti-fuse coupling the node to the reference voltage would force the MASTER_CONTROL signal to be logic low.

Figure 6:
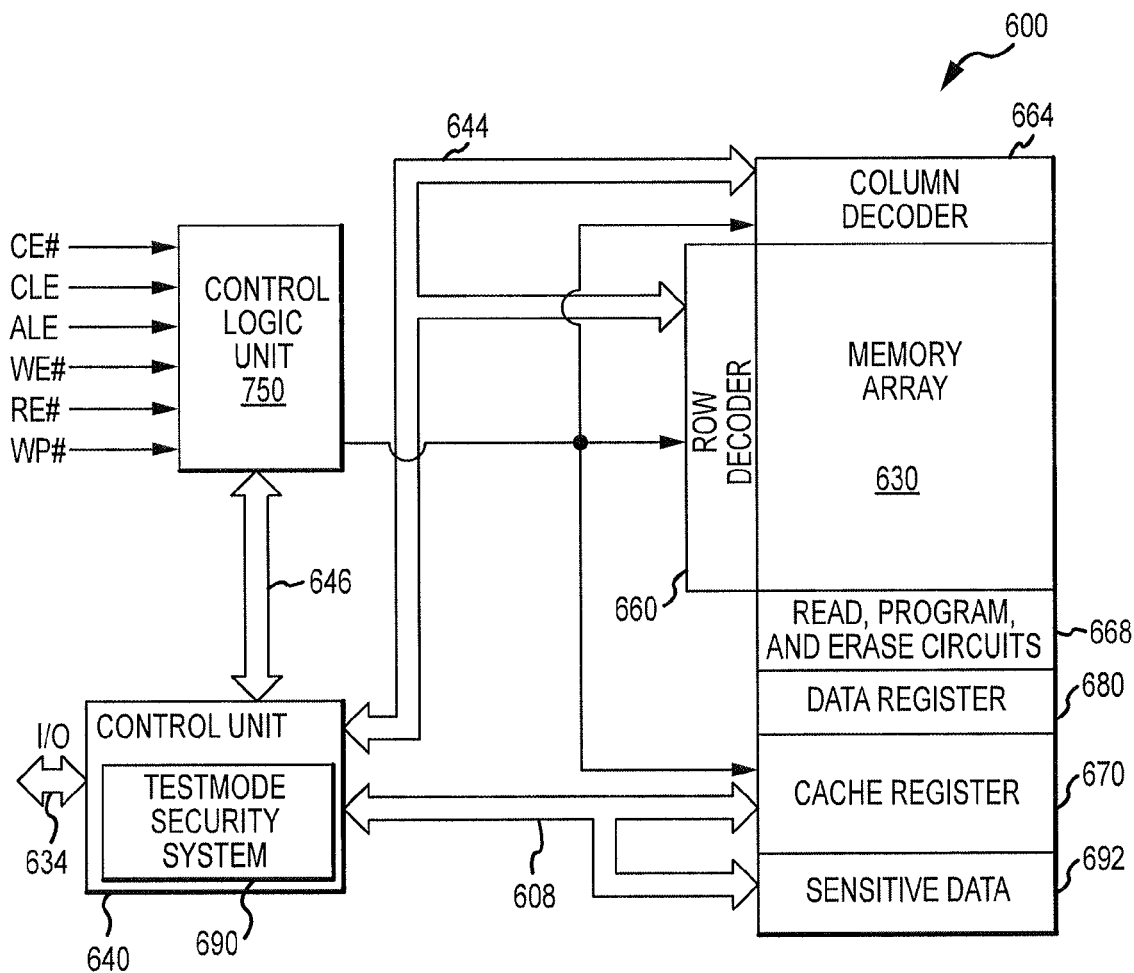
FIG. 6 is a block diagram of a memory according to an embodiment of the invention.

FIG. 6 illustrates portions of a memory 600 including a testmode security system 690 according to an embodiment of the present invention. The memory 600 includes an array 630 of memory cells. The memory cells may be NAND flash memory cells, but may also be NOR flash, DRAM, SDRAM, SPI, phase change, or any other type of memory cells. Command signals, address signals and write data signals may be provided to the memory 600 as sets of sequential input/output ("I/O") signals transmitted through an I/O bus 634. Similarly, read data signals may be provided from the flash memory 600 through the I/O bus 634. The I/O bus is connected to an I/O control unit 640 that routes the signals between the I/O bus 634 and an internal data bus 608, an internal address bus 644, and an internal command bus 646. The memory 600 also includes a control logic unit 650 that receives a number of control signals either externally or through the command bus 646 to control the operation of the memory 600.

The address bus 644 provides block-row address signals to a row decoder 660 and column address signals to a column decoder 664. The row decoder 660 and column decoder 664 may be used to select blocks of memory or memory cells for memory operations, for example, read, program, and erase operations. The column decoder 664 enables write data signals to be provided to columns of memory corresponding to the column address signals and allow read data signals to be coupled from columns corresponding to the column address signals.

In response to the memory commands decoded by the control logic unit 650, the memory cells in the array 630 are read, programmed, or erased. Read, program, and erase circuits 668 coupled to the memory array 630 receive control signals from the control logic unit 650 and include voltage sources for generating various voltages for read, program and erase operations.

After the row address signals have been provided to the address bus 644, the I/O control unit 640 routes write data signals to a cache register 670. The write data signals are stored in the cache register 670 in successive sets each having a size corresponding to the width of the I/O bus 634. The cache register 670 sequentially stores the sets of write data signals for an entire row or page of memory cells in the array 630. All of the stored write data signals are then used to program a row or page of memory cells in the array 630 selected by the block-row address coupled through the address bus 644. In a similar manner, during a read operation, data signals from a row or block of memory cells selected by the block-row address coupled through the address bus 644 are stored in a data register 680. Sets of data signals corresponding in size to the width of the I/O bus 634 are then sequentially transferred through the I/O control unit 640 from the data register 680 to the I/O bus 634.

The memory 600 illustrated in FIG. 6 also includes a sensitive data storage 692. The sensitive data storage 692 may be anywhere within the memory 600. In some embodiments, it may be part of the memory array 630, whereas in other embodiments, the sensitive data storage 692 may be distinct from the memory array 630, the data register 670, the cache register 670, etc. as illustrated in FIG. 6. The memory 600 also includes a testmode security system 690, for example the testmode security system may be included within the control unit 640. The testmode security system 690 may be the testmode security system 100 illustrated in FIG. 1 and described above or another testmode security system. The testmode security system 690 may be configured to allow access to one or more testmodes when the sensitive data storage 692 does not store sensitive data, but may disallow access to the one or more testmodes when the sensitive data storage 692 does store sensitive data.

From the foregoing it will be appreciated that, although specific embodiments of the invention have been described herein for purposes of illustration, various modifications may be made without deviating from the spirit and scope of the invention. For example, FIG. 1 illustrates an embodiment 100 of a testmode security system, FIGS. 2A through 4B illustrate embodiments 250, 350, 450 of a security logic circuit, FIG. 5 illustrates an embodiment 560 of a master control circuit, and FIGS. 1 and 6 illustrate embodiments of apparatuses that include a testmode security system. However, the testmode security systems, security logic circuits, master control circuits, and apparatuses are not limited to having the same design, and may be of different designs and include circuitry different from the circuitry in the embodiments illustrated in FIGS. 1 through 6 and described above, including a rearrangement and/or addition and/or removal of circuitry illustrated in FIG. 1 through 6.

For example, although the security status register 140 illustrated in FIG. 1 has been explained as having a single or two bits of security status information, the security status registers may also in some embodiments include three or more bits of security status information. More bits of security status information may allow, among other things, multiple types or levels of testmodes to be provided depending on the security status information. For example, if the security status information indicates that highly confidential information is stored in a data storage then no access to any testmode may be allowed, if the security status information indicates that moderately confidential information is stored in the data storage then access to some testmodes may be allowed, if the security status information indicates that no confidential information is stored in the data storage then full access to all of the testmodes of an apparatus may be allowed, etc.

As another example, in addition to or in place of the AND and XOR gates illustrated in FIGS. 2B, 3B, and 4B, other types of gates (e.g., NAND, NOR, XNOR, INV, etc.), registers, latches, and other circuit elements may be used to form the security logic circuits 250, 350, 450.

As another example, although the security logic circuit 250 illustrated in FIGS. 2A and 2B does not include a master control circuit or a MASTER_CONTROL signal, the security logic circuit 250 may be modified to allow for a MASTER_CONTROL signal input from a master control circuit, similar to the security logic circuit 450 illustrated in FIG. 4.

As still another example, although FIG. 6 illustrates portions of a memory 600 that includes a testmode security system, a testmode security system may be used in many other different types of apparatuses, such as a processor, a controller, etc.

Accordingly, the invention is not limited except as by the appended claims.

What is claimed is:

1. An apparatus, comprising: a data storage configured to store data; a testmode security system configured to determine if the data storage is storing sensitive data and allow a user to access a testmode of the apparatus at least partially responsive to the data storage not storing sensitive data and controls access to the testmode of the apparatus at least partially responsive to the data storage storing sensitive data; and a master control circuit coupled to the testmode security system, wherein the master control circuit is configured to provide a master control signal to the testmode security system responsive to receiving a logic high signal, wherein the testmode security system is further configured to allow the user to access the testmode regardless of the testmode security system determining the data storage is storing sensitive data or the data storage is not storing sensitive data at least partially responsive to receiving the master control signal from the master control circuit; wherein the master control circuit comprises a bondpad; and wherein the bondpad is bonded to a reference voltage through a bondwire.

2. The apparatus of claim 1, wherein the testmode comprises a plurality of testmodes.

3. The apparatus of claim 1, wherein the testmode comprises all testmodes of the apparatus.

4. The apparatus of claim 1, wherein the testmode security system controls access to the testmode by disallowing the user from accessing the testmode.

5. The apparatus of claim 1, wherein the testmode security system controls access to the testmode by clearing at least some data stored in the data storage before allowing access to the testmode.

6. The apparatus of claim 1, wherein the master control circuit comprises a fuse.

7. The apparatus of claim 1, wherein the data storage comprises a non-volatile storage element.

8. The apparatus of claim 7, wherein the non-volatile storage element is flash memory.

9. The apparatus of claim 1, wherein the sensitive data comprises a security key.

10. The apparatus of claim 1, wherein the testmode security system is further configured to clear at least some sensitive data stored in the data storage responsive to a request to access the testmode.

11. The apparatus of claim 10, wherein the at least some sensitive data comprises all sensitive data stored in the data storage.

12. An integrated circuit, comprising: a data storage configured to store data; and a security logic circuit configured to selectively provide access to a testmode of a plurality of testmodes at least partially responsive to a security status signal, the security status signal configured to be provided at least partially responsive to security status information, wherein the security, status information indicates whether sensitive data is stored in the data storage, wherein the security stares signal corresponds to a plurality of bits in a security status storage element, the plurality of bits indicating whether the data storage stores sensitive data, wherein the plurality of bits comprises a sensitive written bit and a sensitive cleared bit, and wherein the plurality of bits comprises a level of testmode bit, wherein the level of testmode bit indicates to which of the plurality of testmodes the security logic circuit may provide access; wherein the security status signal is configured to be provided to the security logic at least partially in response to a security status storage element.

13. The integrated circuit of claim 12, wherein the security status signal is provided by a security status register.

14. The integrated circuit of claim 12, wherein the security status signal is provided by the security logic.

15. The integrated circuit of claim 12, wherein the single bit is a non-volatile storage element that is bit-alterable in both a first and a second direction.

16. The integrated circuit of claim 12, wherein the security status signal is configured to be provided at least partially responsive to a master control signal.

17. An apparatus, comprising: a data storage configured to store data; and a testmode security system configured to allow a user to access a testmode of the apparatus at least partially responsive to the data storage not storing sensitive data, and to clear at least some of the stored sensitive data at least partially responsive to the data storage storing sensitive data and access to the testmode being requested, wherein the testmode security system comprises: an on-die controller coupled to the data storage; a security status storage element configured to indicate whether the data storage stores sensitive data; a security logic circuit coupled to the security status storage element and to the on-die controller, wherein the security logic circuit is configured to allow access to the test mode responsive to access to the testmode being requested when the security storage element indicates the data storage is not storing sensitive data; a clear circuit coupled to the security logic circuit and configured to clear the at least some of the stored sensitive data; and a master control circuit coupled to the security logic circuit and configured to allow the user access to the test mode regardless of the security status storage element indicating the data storage storing sensitive data.

18. The apparatus of claim 17, wherein the security logic circuit comprises an AND gate.

19. The apparatus of claim 18, wherein a first input to the AND gate is a security status signal corresponding to the security status storage element and a second input to the AND gate is a testmode request signal.

20. The apparatus of claim 17, wherein the master control circuit is configured to provide pre-power-up access to the testmode.

21. A method, comprising: receiving a testmode request signal at a security logic circuit, the testmode request signal indicative of a request for access to a testmode; providing a security status signal to the security logic circuit, the security status signal indicative of a status of a data storage, wherein a first status indicates sensitive data is stored in the data storage and a second status indicates no sensitive data is stored in the data storage; providing a testmode active signal from the security logic responsive to the testmode request signal and the security' status signal, the testmode active signal selectively allowing access to the testmode when the security status signal indicates the first status; receiving a master control signal from a master control circuit indicating that access to the testmode is to be allowed regardless of the security status signal; and allowing access to the testmode responsive to the master control signal; receiving a clear command at a clear circuit; clearing at least some sensitive data from the sensitive data storage; changing the security status signal to indicate that no sensitive data is stored in the data storage; and allowing access to the testmode responsive to the security stares signal indicating that no sensitive data is stored in the data storage.

22. The method of claim 21, wherein the security status signal is received by the security logic circuit.

23. The method of claim 21, wherein the security status signal is provided by the security logic circuit.

24. A method, comprising: maintaining a security status storage element indicating whether sensitive data is stored in a data storage; receiving a master control signal from a master control circuit indicating that access to the testmode is to be allowed regardless of an indication from the status storage element; and allowing access to a testmode responsive to the master control signal; receiving a clear command at a clear circuit; clearing at least some sensitive data from the sensitive data storage; changing the security status signal to indicate that no sensitive data is stored in the data storage; and allowing access to the testmode responsive to the security stares signal indicating that no sensitive data is stored in the data storage.

25. The method of claim 24, further comprising changing the security status storage element when sensitive data is stored in the data storage.

26. The method of claim 24, further comprising changing the security status storage element when sensitive data is cleared from the data storage.

* * * * *